US008811748B2

(12) United States Patent
Morris

(10) Patent No.: US 8,811,748 B2
(45) Date of Patent: Aug. 19, 2014

(54) COLLABORATIVE FEATURE EXTRACTION SYSTEM FOR THREE DIMENSIONAL DATASETS

(75) Inventor: Aaron C. Morris, Pittsburgh, PA (US)

(73) Assignee: Autodesk, Inc., San Rafael, CA (US)

( * ) Notice: Subject to any disclaimer, the term of this patent is extended or adjusted under 35 U.S.C. 154(b) by 112 days.

(21) Appl. No.: 13/476,676

(22) Filed: May 21, 2012

(65) Prior Publication Data

US 2012/0294532 A1 Nov. 22, 2012

Related U.S. Application Data

(60) Provisional application No. 61/488,487, filed on May 20, 2011.

(51) Int. Cl.
| | | |
|---|---|---|
| G06K 9/62 | (2006.01) | |
| G06K 9/00 | (2006.01) | |
| G06K 9/46 | (2006.01) | |
| G06K 9/66 | (2006.01) | |
| G06K 9/03 | (2006.01) | |

(52) U.S. Cl.
USPC ........... 382/195; 382/156; 382/159; 382/165; 382/311

(58) Field of Classification Search
None
See application file for complete search history.

(56) References Cited

U.S. PATENT DOCUMENTS

| | | | |
|---|---|---|---|
| 6,879,718 B2 * | 4/2005 | Hullender ..................... 382/187 |
| 7,383,238 B1 * | 6/2008 | Iverson .......................... 706/25 |
| 7,933,433 B2 | 4/2011 | Ogawa | |
| 7,983,474 B2 | 7/2011 | Van Workum et al. | |
| 8,099,213 B2 | 1/2012 | Zhang et al. | |
| 8,111,147 B2 | 2/2012 | Litkouhi | |
| 8,164,543 B2 | 4/2012 | Seder et al. | |
| 2002/0060734 A1 * | 5/2002 | Hino et al. .................... 348/144 |
| 2007/0064242 A1 | 3/2007 | Childers | |
| 2007/0098252 A1 * | 5/2007 | Cotman et al. ................ 382/159 |
| 2009/0103773 A1 * | 4/2009 | Wheeler et al. ............... 382/100 |
| 2009/0316982 A1 * | 12/2009 | Schaffer ........................ 382/159 |
| 2009/0323121 A1 | 12/2009 | Valkenburg et al. | |
| 2010/0026789 A1 | 2/2010 | Balogh | |
| 2010/0045816 A1 * | 2/2010 | Rhoads ...................... 348/222.1 |
| 2010/0198775 A1 | 8/2010 | Rousselle et al. | |
| 2010/0215252 A1 | 8/2010 | Knighton et al. | |
| 2011/0134225 A1 | 6/2011 | Saint-Pierre et al. | |
| 2012/0019622 A1 | 1/2012 | Rousselle et al. | |

OTHER PUBLICATIONS

Chen, X., Stroila, M., Wang, R., Kohlmeyer, B., Alwar, N., and Bach, J., Next Generation Map Making: Geo-Referenced Ground-Level LiDAR Point Clouds for Automatic Retro-Reflective Road Feature Extraction, 2009, ACM GIS '09, pp. 488-491.*
Zavodny, A., Flynn, P., and Chen, X., Region Extraction in Large-Scale Urban LiDAR Data, 2009, IEEE 12th International Conference on Computer Vision Workshops, pp. 1801-1808.*

(Continued)

*Primary Examiner* — Stephen R Koziol
*Assistant Examiner* — Jonathan S Lee
(74) *Attorney, Agent, or Firm* — Gates & Cooper LLP

(57) ABSTRACT

A collaborative feature extraction system uses crowdsourced feedback to improve its ability to recognize objects in three-dimensional datasets. The system accesses a three-dimensional dataset and presents images showing possible objects to a group of users, along with potential identifiers for the objects. The users provide feedback as to the accuracy of the identifiers, and the system uses the feedback to adjust parameters for candidate identifiers to improve its recognition of three-dimensional assets in future iterations.

20 Claims, 8 Drawing Sheets

(56) References Cited

OTHER PUBLICATIONS

Yan, T., Kumar, V., and Ganesan, D., CrowdSearch: Exploiting Crowds for Accurate Real-time Image Search on Mobile Phones, 2010, MobiSys'10, pp. 77-90.*

Nicholas Shorter, Presentation: "Autonomous 3D Reconstruction From Irregular LiDAR and Aerial Imagery, Beginners Guide to LiDAR Research", May 19, 2007, http://www.nshorter.com/html/lidar_presentation.html.

PCT International Search Report and Written Opinion dated Feb. 28, 2013 for PCT Application No. PCT/US2012/057960.

* cited by examiner

COLLABORATIVE FEATURE EXTRACTION SYSTEM FOR THREE DIMENSIONAL DATASETS

RELATED APPLICATIONS AND CLAIM OF PRIORITY

This patent document claims priority to U.S. Provisional Patent Application No. 61/488,487, filed May 20, 2011, the disclosure of which is incorporated herein by reference in its entirety.

BACKGROUND

This document relates to a method and system for analyzing feedback from a variety of users to improve a process of recognizing and distinguishing objects in a three-dimensional dataset, such as a dataset captured by a light detection and ranging (LiDAR) system.

Recent technological advancements in laser scanning and similar technologies have made it possible to acquire vast quantities of accurate, dense, three dimensional (3D) data that can be used to determine the shape of an object or one or more features of a scene. Traditionally, extracting useful information from large datasets has been accomplished by requiring a human to visually interact with the data and identify important features within the data. However, as the quantity of captured data continues to explode, it becomes increasingly time-consuming and error-prone to rely on prior art methods.

This document describes a method and system that solves at least some of the issues discussed above, and/or other problems associated with the analysis of large 3D based datasets.

SUMMARY

In an embodiment, a collaborative feature extraction system includes a knowledge base containing a first dataset, a second dataset, a knowledge base, and a computer-readable medium containing programming instructions that cause the processor to implement a method when executed. The first dataset includes parameters that are associated with one or more candidate objects that may be contained in the second dataset. The second dataset includes three-dimensional data representing a geographic area, as well as one or more assets within the geographic area. When implementing the method, an interested user may request that the system find a candidate object, and the system then analyzes the three-dimensional dataset and identifies a candidate object as a potential asset by comparing subsets of the second set of data with one or more of the parameters in the first dataset specific to the potential asset. The system outputs, to one or more users, a first image representing the candidate object a representation of the potential asset, and a user prompt. In response, the system receives one or more user responses indicating whether the candidate matches the asset. The system may generate a report to the interested user of the candidate objects verified to be assets and the system updates the knowledge base by adjusting one or more of the parameters associated with the selected asset based on the user responses.

Optionally, when determining that the candidate object may be the asset, the system may compare a measurement of points in the subset of the second dataset with a measurement of points parameter for a group of the assets to yield a first result. It may also compare a dimension in the second dataset for the candidate object with a dimensional parameter for a group of the assets to yield a second result. It may then identify the candidate object as the selected asset based at least in part on the first result and the second result.

In an additional embodiment, when determining that the candidate object may be the asset, the system may compare a color value in the second dataset for the candidate object with a color parameter for a group of the assets to yield a color comparison result. If so, it may identify the candidate object as the selected asset based at least in part on the color comparison result. The system also may update the knowledge base by adjusting a color parameter associated with the selected asset based on the color value for the candidate object.

In an additional embodiment, when determining that the candidate object may be the asset, the system may compare an intensity value in the second dataset for the candidate object with an intensity parameter for a group of the asset to yield an intensity comparison result. If so, it may identify the candidate object as the selected asset based at least in part on the intensity comparison result. The system also may update the knowledge base by adjusting an intensity parameter associated with the selected asset based on the intensity value for the candidate object.

When outputting the image, the system may use the three-dimensional data for the candidate object to determine multiple views of the candidate object. If so, the system also may output a second image representing the candidate object, wherein the first image comprises a first view and the second image comprises a second (and different) view. In another embodiment, when outputting the image the system may identify multiple components of the candidate object, enhance one of the components to distinguish the enhanced component from at least one other component of the candidate object, and output the first image so that the enhanced component is visually distinguished from the other component.

In various embodiments, the knowledge base may include global positioning system data representing a location of the geographic area. The three-dimensional data may include light detection and ranging system data including distance information, color information, and intensity information for various points within the geographic area. When identifying the candidate object, the system may require that the candidate object be represented by a group of data points in the data set having time stamps that are no more than a first threshold magnitude apart, as well as location values that are no more than a first threshold magnitude apart. It may also require that the candidate object be identified by a subset of data points from that group, where the subset has attributes that match parameters of the selected asset.

DETAILED DESCRIPTION

This disclosure is not limited to the particular systems, devices and methods described, as these may vary. Also, the terminology used in this document is only for the purpose of describing particular versions or embodiments, and it is not intended to limit its scope. As used in the description below and in the appended claims, the singular forms "a," "an," and "the" include plural references unless the context clearly dictates otherwise. Unless defined otherwise, all technical and scientific terms used in this document have the same meanings as commonly understood by one of ordinary skill in the art.

For the purposes of this document, an "electronic device" refers to a device that includes a processor and non-transitory, computer-readable memory. The memory may contain programming instructions that, when executed by the processor, cause the device to perform one or more operations according to the programming instructions. Examples of electronic devices include personal computers, cameras, video processing equipment, and portable electronic devices such as smartphones, personal digital assistants, cameras, tablet computers, laptop computers, media players and the like.

As used in this document, a statement that a device or system is "in electronic communication with" another device or system means that devices or systems are configured to send data, commands and/or queries to each other via a communications network. The network may be a wired or wireless network such as a local area network, a wide area network, an intranet, the Internet or another network.

Figure 1:
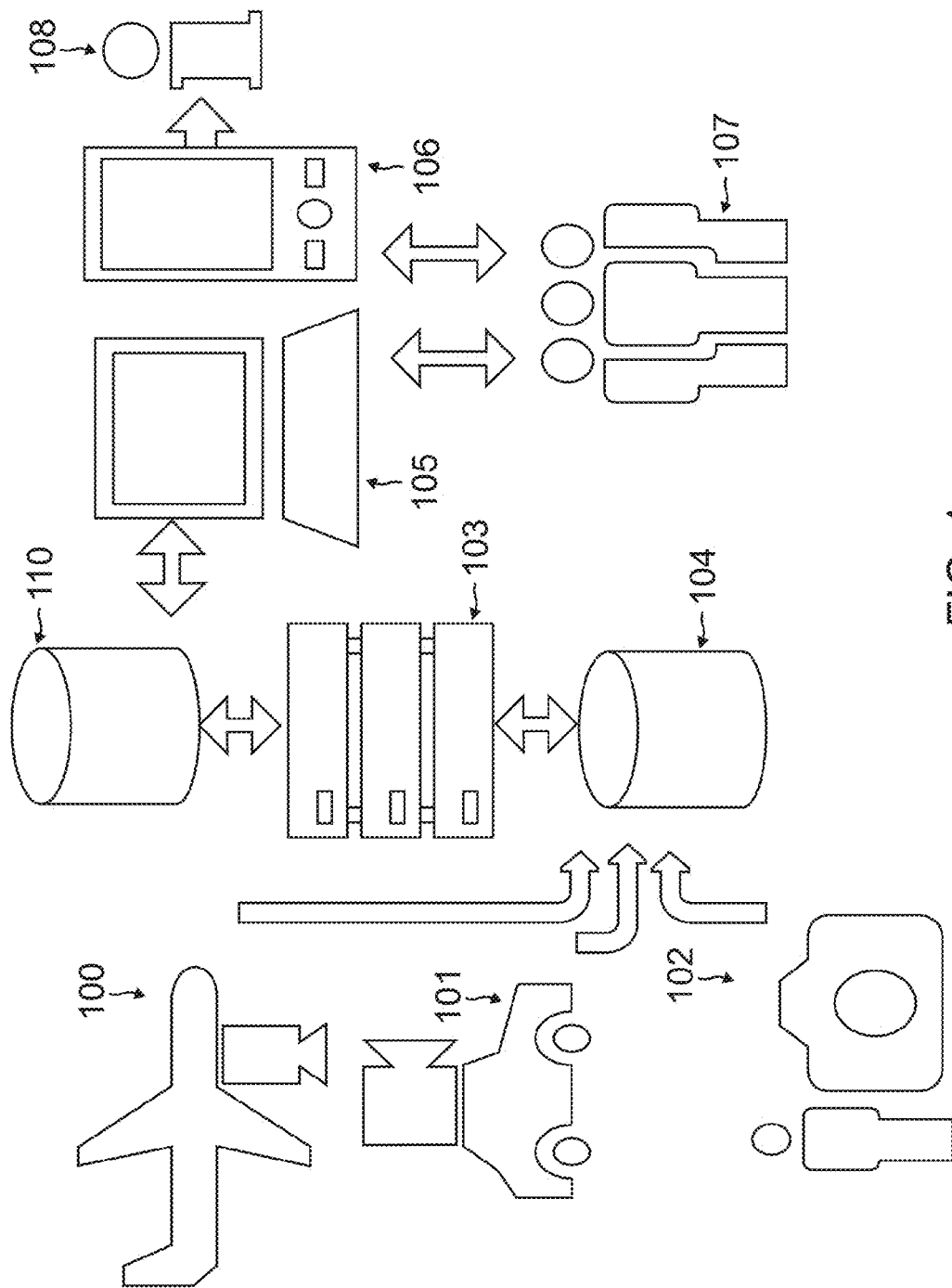
FIG. 1 is a block diagram showing various elements that may be included in a collaborative feature extraction system, along with elements that may interact with such a system.

FIG. 1 illustrates various elements that may be included in, or that may interact with, a collaborative feature extraction system. A computer-readable memory contains a data set 104 that includes three-dimensional (3D) data representing a geographic area and one or more possible assets, referred to in this document as candidate objects, within the geographic area. An asset is an object that may be sensed in an environment. 3D data is data that is captured by one or more sensors and which is representative of one or more 3D objects. When used with processing software, 3D data allows a computing device to plot and/or display the candidate object from multiple views and/or with topographical information. An example of a 3D data set is a list of triplet numbers that normally refer to a position on the x-, y- and z-axes of a Cartesian coordinate system. 3D data may be also represented as a set of voxels, or cubic pixels, each of which includes various data elements that collectively represent a point on a 3D grid. For example, the data set 104 may include data that is received directly or indirectly from a mobile light detection and ranging (LiDAR) system. Examples include: (i) an airborne LiDAR system 100 that may be included in an airplane, helicopter or satellite; and (ii) a ground-based mobile LiDAR system 101 that is included with a terrestrial vehicle. The data set 104 need not be limited to 3D data, and it also may include other types of data. For example, the data set 104 also may include 2D data and/or location-based data received directly or indirectly from a camera 102, a global positioning data sensor, or any other type of data sensor.

A processor 103 is in electronic communication with the data set 104 as well as a knowledge base 110. The knowledge base includes parameters for any number of assets that may be recognized. The processor also communicates with one or more user electronic devices 105, 106 to provide information to multiple human users 107 of the system. The processor also communicates with a computer-readable memory to extract data from the data set 104 and identify whether the dataset includes any candidate objects having attributes that correspond to parameters of one or more of the assets in the knowledge base.

As an example, a mobile LiDAR device 101 may use a laser scanner to collect range and intensity data from a road surface as the device moves along the roadway. The range and intensity data may differ as the device encounters different assets, such as paint markings, road signs, curbs, median strips, potholes and other objects within or along the roadway. The mobile LiDAR device 104 may include, for example a laser scanner, inertial navigation system (INS), and global positioning system (GPS) mounted on or within a vehicle. The laser scanner may detect range and intensity information about each asset relative to the location of the vehicle. The GPS may collect data that represents the location of the vehicle. The LiDAR system also may include a clock or other device or process that generates a time stamp for some or all of the data points so that the data points may be correlated. This information is then transferred to the data set 104, such as via a wireless communications network, or by downloading to physical media for later uploading to the data set 104, either through a direct connection or indirectly through one or more communications networks.

The processor 103 may use any now or hereafter known analysis software to review the dataset and identify candidate objects (i.e., potential assets) that are represented in the dataset. For example, the processor 103 may do this by retrieving one or more parameters for assets from the knowledge base 110, and then filtering the dataset 104 to identify groups of data having attributes that match the parameters of one or more of the assets. Following the example above, the knowledge base 110 may include a road marking as an asset. Parameters that the knowledge base 110 associates with the road marking may include measurement of points, which may include a ratio, surface density, or a relative measurement of number of pixels in one direction as compared to the relative number of pixels in a perpendicular direction (thus indicating a long narrow strip, as one may expect to see with a white line on a road). Parameters may also include one or more intensity values. For example, to be selected for inclusion in a road marking a data point may be required to have an intensity value within some tolerance of a threshold $$|X_{VALUE} - X_{THRESHOLD}| \le \epsilon$$

(where X is the intensity value and threshold, respectively, and $\epsilon$ is the tolerance), or it may be required to have an intensity value that is at least a threshold level of brightness above an adjacent area (indicating that it must have a much higher intensity measurement than data representing the relative unpainted portion of the road surface).

The system may use the time stamps and/or GPS data associated with each data point to determine which of the points should be grouped together. For example, the system may require that only data points having common time stamps or GPS data values may be grouped together. Alternatively, to allow grouping the data's time stamps and/or GPS data values may be required to be no more than a threshold magnitude apart.

Figure 2:
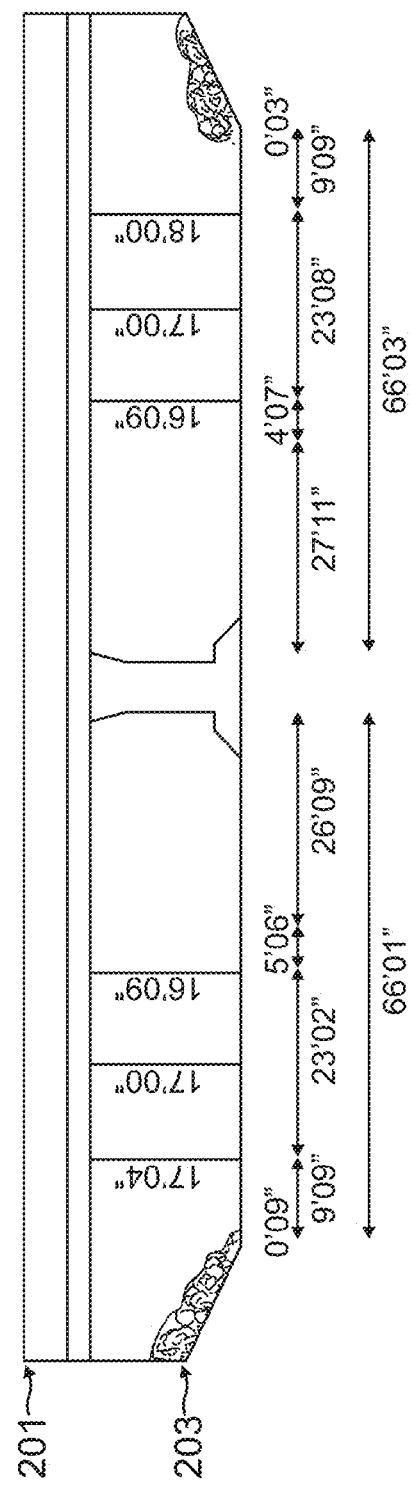
FIG. 2 is an example of an image produced from a 3D dataset, in this example a LiDAR dataset showing a bridge.

Based on the retrieved portion of the data set, the processor generates an image, such as a two-dimensional (2D) image, of the identified candidate object. Optionally, the image also may include other candidate objects or features of the geographic area near the identified candidate object. An example of such an image is shown in FIG. 2, which is an image generated from LIDAR data, showing a bridge 201 above a roadway surface 203. The image is formatted to be presented in a manner that is easily comprehensible to a user. For example, the format may be such that it presents the user with a 2D image, a 3D image, vector graphics, a computer aided design model, lists of information, or other representation of the data. In addition, the formatting may include colorizing or other enhancements that distinguish one or more components of the candidate object components from others, or which highlight the locations of hidden features of the candidate object. For example, a top view of the bridge of FIG. 2 could include a color-enhanced area in the middle of the view, such that the color-enhanced area corresponds to an image of the bridge's central pillar. As another example, a top view of a building could include color-enhanced areas corresponding to walls and supports inside the building, thus providing a virtual floor plan. The data for the enhanced features could be taken from other views, such as a side view, where the features would ordinarily be visible. An additional example of feature enhancement will be discussed below in the context of FIG. 3.

Figure 3:
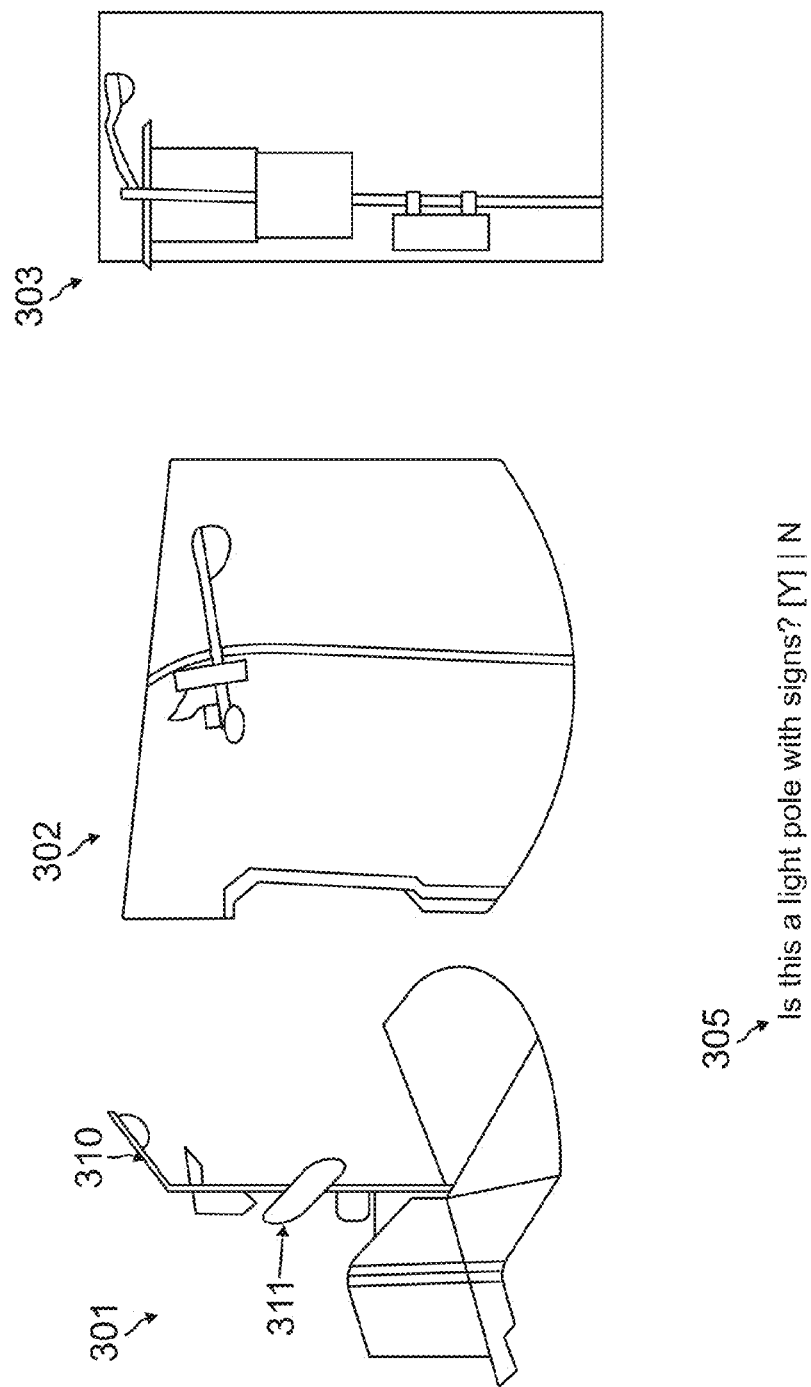
FIG. 3 is an example of an output of a collaborative feature extraction system, with a prompt asking a user to verify the identity of the displayed candidate object.

Returning to FIG. 1, the processor may generate an output that may be sent to multiple user devices (such as a computer 105 or mobile electronic device 106) for the users to review, perform quality assurance through verification, and provide feedback. The output may include one or more electronic files or data streams having information sufficient to allow the user devices to render an image of the candidate object, some representation of the asset, and a user prompt. For example, FIG. 3 illustrates a display of an electronic device that outputs three views 301, 302, 303 of a candidate object. The views may include feature enhancement to distinguish some features of the candidate object from others. In the example of FIG. 3, the views illustrate a light pole 310 and signs on the pole, but the signs 311 are presented in a different color so that a user can distinguish the signs from the pole. The display also may include a prompt 305 asking the user whether the image represents a light pole with signs. In this case, the prompt 305 includes the representation of the asset (i.e., an identification of the asset as a light post with signs). However, the representation of the asset may be presented in other formats, such as a reference image or example of the asset retrieved from the knowledge base, as an audio output that describes the asset, or in other formats.

Returning to FIG. 1, the output may be transmitted to the user devices 105, 106 via one or more wired or wireless communications networks. For example, the processor 103 may be part of a cloud computing or other facility that is remote from the users' locations. Alternatively, the processor 103 and user devices 105, 106 may be part of a single enterprise one or more interconnected enterprises and/or communications networks.

The system may use crowdsourcing to allow the users to perform quality checking and indicate whether or not the candidate object is correctly identified as the asset. This process also may use the group feedback to improve feature extraction through machine-based learning as more data is available to refine the extraction parameters. Multiple users 107 may view the output and respond to the prompts and indicate whether or not the displayed asset matches the presented candidate object. The processor 103 may retrieve the responses and update the knowledge base by adjusting one or more parameters associated with the asset presented by the users based on the user responses. For example, if at least a threshold number of responding users (such as 30% of the responding users) provide a negative response (indicating that the candidate object is not the asset), then the processor may update the parameters in the knowledge base for the asset to exclude one or more attributes of the candidate object from the asset's parameters. Alternatively, if a candidate object has attributes that are at or near an edge of a parameter range for the asset, and if at least a threshold number of users (such as 90%) indicate that the candidate object matches the asset, then the processor may update the knowledge base to expand the parameter range to provide a greater cushion around the value that is associated with the asset. Thus, the knowledge base applies machine learning to refine the parameters of one or more assets based on user feedback for the candidate objects.

Any or all of the information provided to the electronic devices or processed by the processor may be transmitted or presented to one or more users as a report 108, such as a data file containing assets, attributes of the assets, and parameters and/or parameter ranges for the assets. The report 108 may include one or more maps, models, animations, plots, tabular records, data, or diagrams. The report 108 may be reviewed and cleared for errors via responses given by the users 107 in their feedback.

The data included in the data set 104 may include sensed data and/or associated metadata. For example, the sensor data may include 3D range, point and/or distance measurements; corresponding intensity and/or grayscale information; color information; and surface normals. Such data may be acquired through a variety of mechanisms, such as those shown in FIG. 1, flash LiDAR, stereo vision, photogrammetry, and/or shape-from motion systems. Metadata may include auxiliary information such as time stamps, trajectory or other positional data associated with the collection sensor(s), location and/or GIS information, environmental conditions (e.g., temperature, humidity), camera images, infrared images, video, inertial data, odometer readings, compass data, field notes, and any other information that may be relevant to help a user or the system understand the environment and collection platform that existed when the sensor data was collected. This data may be stored in the data set 104, which may be maintained on one or more physical storage media.

Figure 4:
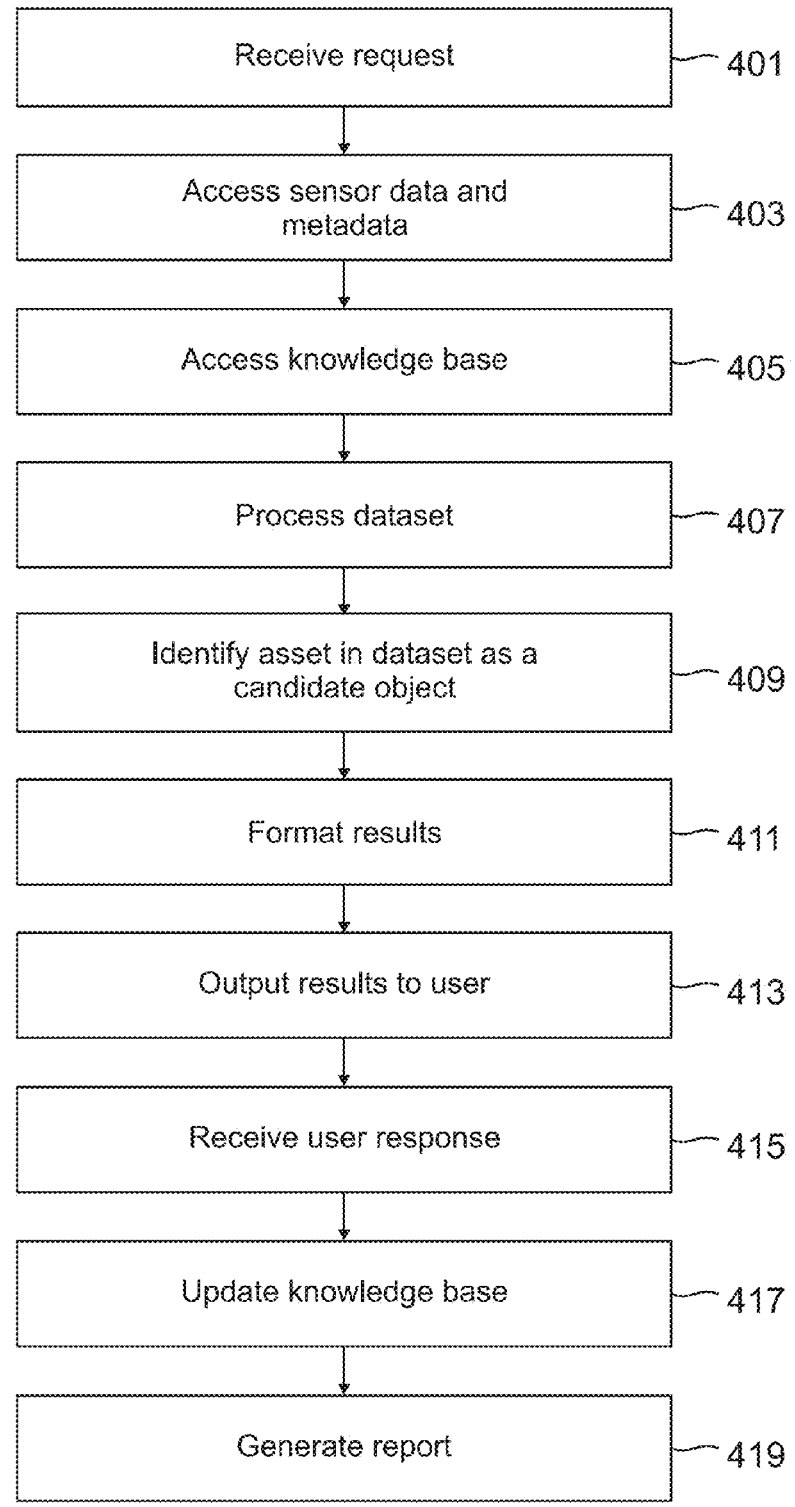
FIG. 4 is a flowchart describing various elements of a collaborative feature extraction process.

FIG. 4 illustrates various steps that a collaborative feature extraction recognition system may perform to improve its method of recognizing assets in a 3D dataset. The system may receive a request or command to initiate the process (step 401). The request may be a request to locate all assets of a specific category in a geographic area (e.g., "find all bridges"). Alternatively, the request may be to locate all assets of any type, or all assets within a threshold range of a base point, in a geographic area. Other request parameters are possible.

The system may access (step 403) a three-dimensional dataset that includes sensor data of a 3D asset and associated metadata. The sensor data may include, for example, a set of volumetric pixels, any or all of which have associated attribute values such as intensity, color, and/or distance values. The system also may access a knowledge base (step 405) of assets. The knowledge base will include, for each asset, a set of parameters. Examples of parameters include a range of intensity values, a range of color values, a number of pixels, one or more acceptable geographic location categories, and/or other 3D data values or metadata values.

The system use one or more search functions to process the dataset (step 407) and identify one or more candidate objects (step 409) in the dataset as one or more of the knowledge base's asset. The identified candidate object may have attribute values that correspond to suitable parameters for the selected asset(s).

As an example, when the system processes data collected from roads or highways, classes of assets may include features such as lane markings, road surfaces, curbs, guard rails, overpasses, bridges, telephone poles, street lights, manholes, fire hydrants, post boxes, vegetation, buildings, towers and signage. In the example of lane markings, asset parameters may include an intensity threshold that distinguishes non-painted areas from areas that are painted with lane markings. The search functions then may seek pixels or a group or region of pixels having intensity values that are above the parameter thresholds. Once a first candidate object is initially identified, the system may use the identity of the first candidate object to identify additional candidate objects based on proximity parameters. A proximity parameter is a value indicating how close an asset of one category is expected to be to an asset of a second category. For example, once a lane marking is identified as a candidate object, proximity parameters may be used to identify nearby potential turn arrow markings, crosswalk markings, curbs, or other assets.

The algorithms used by the search function may vary depending on the assets and candidate objects involved. For example, the search function may use thresholds that test whether a particular correlated range measurement belongs or does not belong to a desired result. Such functions may include elevation filters, intensity filters, normal filters, and clustering and/or sorting algorithms such as 3D Delaunay triangulations, convex hull algorithms, 3D K-trees, octrees and voxelization. In the example of paint markings, the method may use an intensity filter that separates pixels representing non-marked road from pixels representing marked road.

The system may format the results (step 411) of the analysis into one or more images that may be output to a user (step 413). The output may include, for example, an image representing the candidate object, a representation of the selected asset and a user prompt. The formatting may include various views of the candidate object, and as shown in FIG. 3 the views 301, 302, 303 may be included in the output and transmitted to the user for display on the user's electronic device. The output also may include a user prompt 305 asking the user to identify the candidate object or verify the identity of the candidate object. For example, the prompt may present multiple candidate object representations to the user and ask the user to select one of the candidates. Alternatively, the prompt may ask for a "yes/no" type response. Or, it may invite the user to enter (by voice or text) a free-form response, and the system may use semantic reasoning or other recognition methods to determine whether the response appears to match a description of any of the assets.

When the system receives the user's response (step 415) indicating whether the selected asset matches the selected candidate object, the system may update the knowledge base (step 417) by adjusting one or more of the parameters associated with the selected candidate object based on the user's response. The system also may present the representation of the matched asset to the user, either for additional verification or for informational purposes as a report (step 419).

As an example of system operation, to identify the candidate object as an asset, the system may compare a measurement of points that cover the candidate object, such as a total number of points or a surface density of points, with a measurement of points parameter for a each of the assets to yield a first result. It may also compare a value of a dimension (e.g., height, width, depth, number of pixels) for the candidate object with a dimensional parameter for each of the assets to yield a second result. If the measurement of points value satisfies the measurement of points parameter and the dimension value satisfies the dimension parameter, the system may identify the candidate object as one of the assets based at least in part on the first result and the second result.

Similarly, the system may compare color values and/or intensity values of pixels for the candidate object with color parameters and/or intensity parameters for assets in the knowledge base. It may identify the candidate object as an asset if the color values and/or intensity values of the candidate object's pixels are within the asset's parameter ranges. It may then update the color parameters and/or intensity parameters in the knowledge base for that asset based on one or more user responses as described above.

Figure 5:
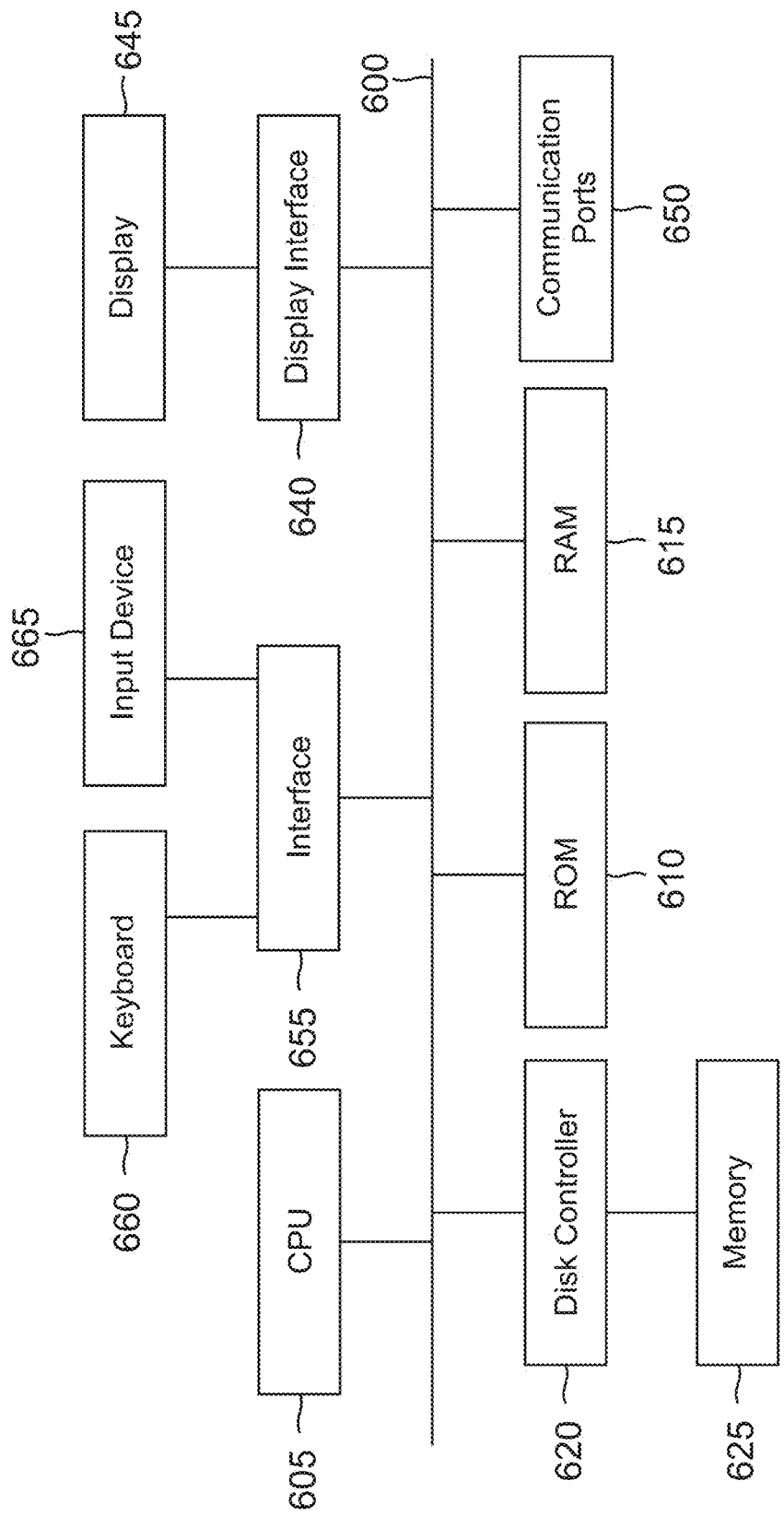
FIG. 5 is a block diagram showing optional elements of a computing device that may process programming instructions.

FIG. 5 depicts a block diagram of internal hardware that may be used to contain or implement the process control components discussed above. A bus 600 serves as the main information highway interconnecting the other illustrated components of the hardware. CPU 605 is a processor, the central processing unit of the system that performs calculations and logic operations required to execute a program. CPU 605, alone or in conjunction with one or more of the other elements disclosed in FIG. 5, is a processing device, computing device or processor as such terms are used within this disclosure. Read only memory (ROM) 610 and random access memory (RAM) 615 constitute examples of memory devices.

A controller 620 provides an interface between with one or more optional tangible, computer-readable memory devices 625 and the system bus 600. These memory devices 625 may include, for example, an external or internal DVD or CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the methods and systems as discussed above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 640 may permit information from the bus 600 to be displayed on the display 645 in audio, visual, graphic or alphanumeric format. The information may include information related to a current job ticket and associated tasks. Communication with external devices may occur using various communication ports 650. An exemplary communication port 650 may be attached to a communications network, such as the Internet or an local area network.

The hardware may also include an interface 655 which allows for receipt of data from input devices such as a keyboard 660 or other input device 665 such as a mouse, a joystick, a touch screen, a remote control, a pointing device, a video input device and/or an audio input device.

Example Application of the System

Figure 6:
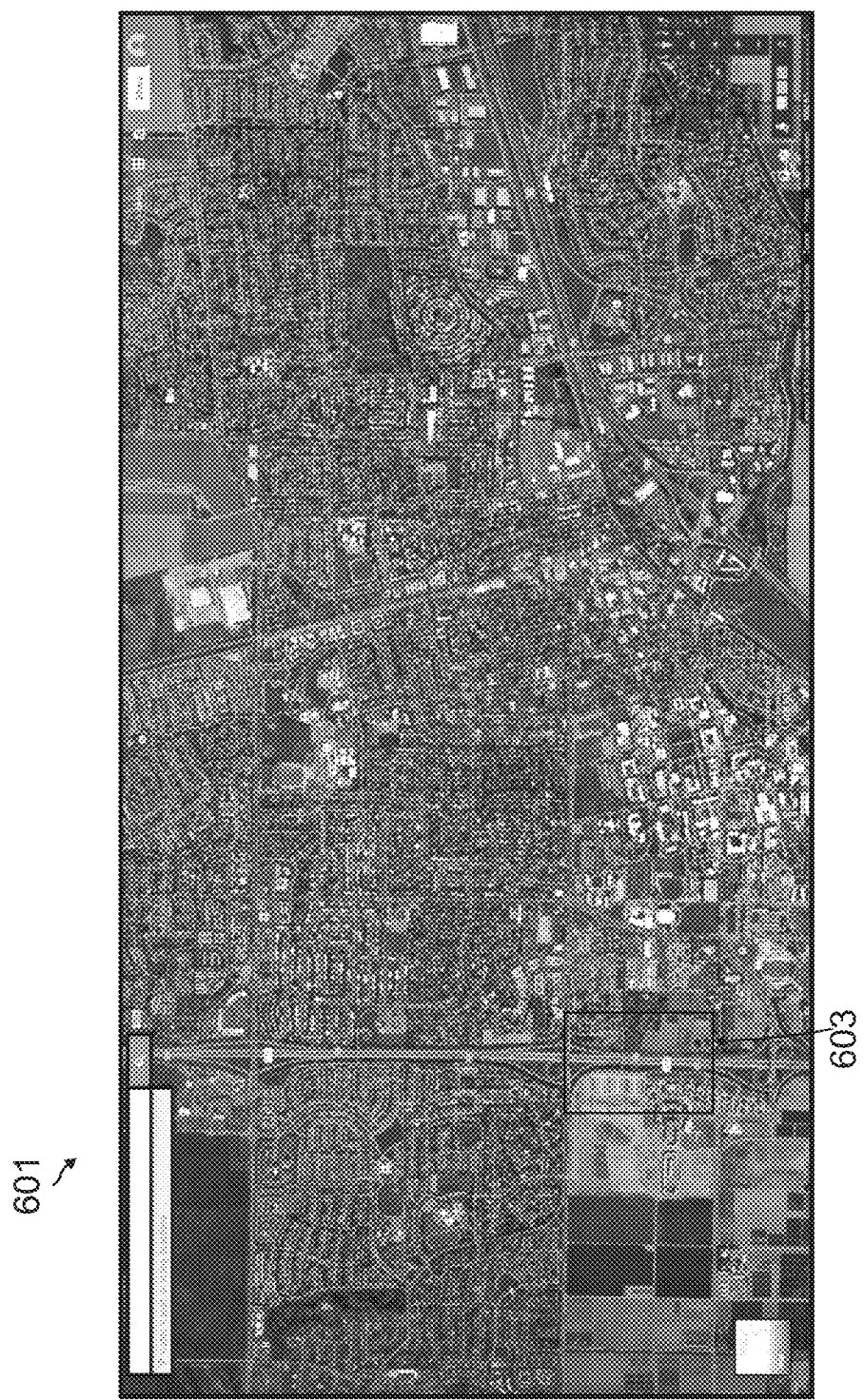
FIG. 6 is an example of a technique of dividing 3D data into smaller blocks.

FIG. 6 illustrates an example of a process of feature extraction and classification augmented with human perception, in accordance with an embodiment. In this example, the system is used to produce bridge clearance reports. Bridge clearance reports are documents containing vertical and horizontal measurements of the space underneath a bridge or overpass.

To produce this report, a series of segmentation, classification, feature extraction and quality control measures are taken.

First a mobile LiDAR data set (represented by image 601) is loaded into server where it is processed. The mobile data set includes LiDAR (a three-dimensional point cloud where every point has intensity and time information), a trajectory (a file describing the path of the collection vehicle), video or photographic data (with time information) and parameters (the coordinate system, units, and date of collection). The LiDAR results are separated into blocks 603, which are small sections of the entire data collection. Blocking creates smaller, more manageable files or data chunks for processing.

After blocking, each data block is loaded into memory where the points are segmented. Segmentation first decomposes the LiDAR scan into local clumps of point data about each data point. Features are calculated from these geometric groups, which include but are not limited to the point density, covariance and principle components (PCA). These local clumps are then merged according to their similarity to other nearby clumps (i.e. point sets with similar features are grouped together). Clumps specific to various features will ultimately be merged together until no additional local groups can be added that match the aggregated feature set. These merged groups are known as segments. Common objects that segment in data containing bridges and overpasses include road surfaces, bridge undersurfaces, bridge faces, guard rails, jersey barriers, and other vehicles.

Following segmentation, each segment is classified and labeled. Features computed during segmentation as well as new features computed from the entire segment are used to determine class. New features include the length, width, height and average intensity of the segment. These features are run through a Naïve Bayes Classifier or k-nearest neighbor algorithm where prior probabilities (priors) or closest specified feature sets, respectively, determine the asset class of the candidate object. Priors are derived initially from manual input, but will be improved as will be detailed later in this invention description. In this example, features for the ground will exhibit a high point density; a circular covariance; a 2D principle components; lengthy, wide, and short dimensions; and low average intensity. Segments with features similar to this description will be labeled road. Bridges, barriers and other automobiles will exhibit different priors.

Figure 7:
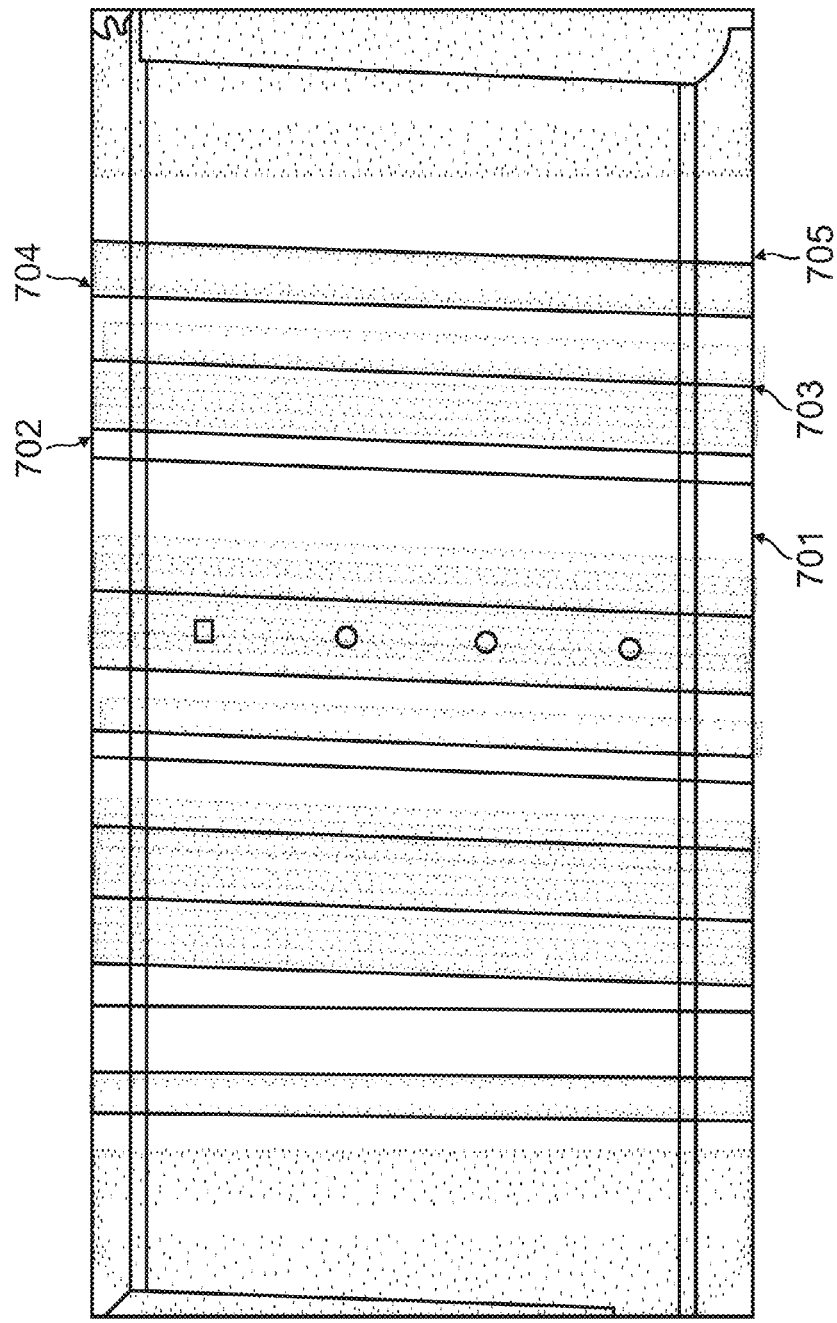
FIG. 7 is another example of an image produced from a 3D dataset, in this example a road with lane markings.

After classification, the results are presented on a web-based interface as a collection of 2D images with feature-based color enhancements. Presentation of data as 2D images with feature-based color enhancements allow for easy streaming of data over the web to web browsers and easy interpretation to users. In this example, illustrated in FIG. 7, the road is presented as a candidate object in a top-down intensity image with high-intensity lane markings marked with color lines 701-705. Users reviewing the data will quickly be able to verify if the correct segmentation and classification has taken place by seeing the road and line markings. In addition, as was illustrated in FIG. 2, bridges 201 are presented as 2D orthographic projects based upon the direction of the road surface 203. This view allows users to check the quality of the bridge segmentation and classification.

If the road or bridge segmentation or classifications are wrong, the system may reject the result or in some cases, offer a user the option to manually fix the result. Rejected results are removed from the result set. If the result was manually fixed, it is saved and/or used to update the knowledge base.

Figure 8:
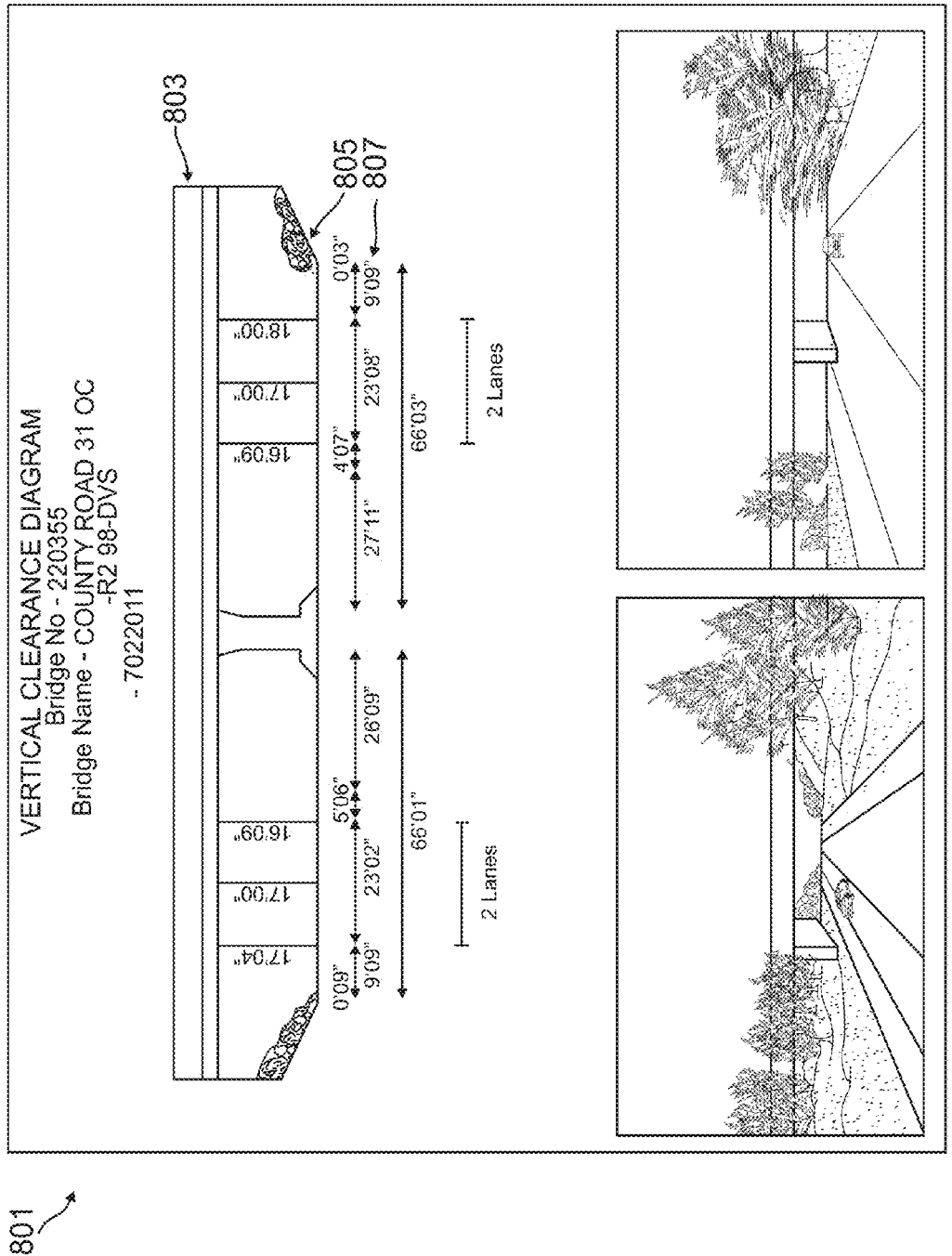
FIG. 8 illustrates an example of a report produced by a collaborative feature extraction system.

Following user interaction, results may be formatted and presented to a user in a format such as that shown in FIG. 8. In the case of bridge clearance reports, the report 801 is generated showing the bridge 803, road surface 805 and various measurements 807 relating to either or both of the assets. The report may be transmitted to a user or made available for downloading via a web interface.

Once in this completed form, results from user interaction are fed back into the processing system. These results are added to the software's training data where supervised learning retrains the priors. Regression analysis may be used to produce new priors, which are used in subsequent processing steps.

Some or all of the features and functions described above may be combined into many other different systems or applications. The disclosed embodiments are intended to include not only those specifically described, but also various presently unforeseen or unanticipated alternatives, modifications, variations or improvements that may be made by those skilled in the art.

The invention claimed is:

1. A collaborative feature extraction system, comprising:
a knowledge base containing a first dataset, the first dataset comprising parameters that are associated with one or more assets;
a second dataset, the second dataset comprising three-dimensional data representing a geographic area and one or more candidate objects within the geographic area;
a processor in electronic communication with the knowledge base; and
a computer-readable medium containing programming instructions that, when executed, cause the processor to:
analyze the three-dimensional data to identify one of the candidate objects as a selected one of the assets by comparing the second dataset with one or more of the parameters in the first dataset;
output, to multiple users, a first image representing the identified candidate object and a user prompt;
in response to the user prompt, receive user responses from each of the multiple users indicating whether the selected asset matches the identified candidate object; and
based on receipt of user responses from a threshold number of users that indicate the selected asset matches the identified candidate object and when the identified candidate object has attributes that are at an edge of a parameter range for the selected asset, update the knowledge base by expanding the parameter range associated with the selected asset.

2. The system of claim 1, wherein the instructions that, when executed, cause the processor to identify the candidate object as the selected asset comprise instructions to:
compare a measurement of points in the second dataset for the identified candidate object with a measurement of points parameter for a subset of the assets to yield a first result;
compare a dimension in the second dataset for the identified candidate object with a dimensional parameter for a plurality of the assets to yield a second result; and
identify the identified candidate object as the selected asset based at least in part on the first result and the second result.

3. The system of claim 1, wherein:
the instructions that, when executed, cause the processor to identify the candidate object as the selected asset comprise instructions to:

compare a color value in the second dataset for the identified candidate object with a color parameter for a plurality of the assets to yield a color comparison result, and identify the identified candidate object as the asset based at least in part on the color comparison result; and the instructions that, when executed, cause the processor to update the knowledge base comprise instructions to adjust a color parameter associated with the selected asset based on the color value for the identified candidate object.

4. The system of claim 1, wherein the instructions that, when executed, cause the processor to identify the candidate object as the selected asset comprise instructions to:

compare an intensity value in the second dataset for the candidate object with an intensity parameter for a plurality of the assets to yield an intensity comparison result; and identify the candidate object as the selected asset based at least in part on the intensity comparison result.

5. The system of claim 4, wherein the instructions that, when executed, cause the processor to update the knowledge base comprise instructions to adjust an intensity parameter associated with the selected asset based on the intensity value for the identified candidate object.

6. The system of claim 1, wherein the instructions that, when executed, cause the processor to output an image representing the identified candidate object comprise instructions to:

determine, based on the three-dimensional data for the identified candidate object, a plurality of views of the identified candidate object; and output, to one or more of the multiple users, a second image representing the identified candidate object, wherein the first image comprises one of the views and the second image comprises a different one of the views.

7. The system of claim 1, wherein the computer-readable medium also comprises instructions to generate a report that identifies a plurality of candidate objects that users identified as assets.

8. The system of claim 1, wherein:

the knowledge base also comprises global positioning system data representing a location of the geographic area; and the three-dimensional data comprises light detection and ranging system data including distance information, color information, and intensity information for a plurality of points within the geographic area.

9. The system of claim 1, wherein the instructions that, when executed, cause the processor to identify the candidate object as the selected asset comprise instructions to:

identify a group of data points in the second dataset having time stamps that are no more than a first threshold magnitude apart, as well as location values that are no more than a first threshold magnitude apart;

identify, from within the group, a subset of data points having attributes that match parameters of the selected asset.

10. The system of claim 1, wherein the instructions that, when executed, cause the processor to output the first image representing the identified candidate object comprise instructions to:

determine a plurality of components within the identified candidate object;

enhance a first one of the components to distinguish the first component from a second one of the components; and output, to one or more of the multiple users, the first image so that the first component is visually distinguished form the second component.

11. A method comprising, by a processor:

accessing a knowledge base containing a first dataset, the first dataset comprising parameters that are associated with one or more assets;

accessing a second dataset, the second dataset comprising three-dimensional data representing a geographic area and one or more candidate objects within the geographic area;

analyzing the three-dimensional data to identify one of the candidate objects as a selected one of the assets by comparing the second dataset with one or more of the parameters in the first dataset;

outputting, to multiple users, a first image representing the identified candidate object, a representation of selected asset and a user prompt;

receiving user responses from each of the multiple users indicating whether the selected asset matches the identified candidate object; and based on receipt of user responses from a threshold number of users that indicate the selected asset matches the identified candidate object and when the identified candidate object has attributes that are at an edge of a parameter range for the selected asset, updating the knowledge base by expanding the parameter range associated with the selected asset.

12. The method of claim 11, wherein the element of identifying the identified candidate object as the selected asset comprises:

comparing a measurement of points in the second dataset for the identified candidate object with a measurement of points parameter for a plurality of the assets to yield a first result;

comparing a dimension value in the second dataset for the identified candidate object with a dimensional parameter for a plurality of the assets to yield a second result; and identifying the identified candidate object as the selected asset based at least in part on the first result and the second result.

13. The method of claim 11, wherein:

the element of identifying the identified candidate object as the selected asset comprises:

comparing a color value in the second dataset for the identified candidate object with a color parameter for a plurality of the assets to yield a color comparison result, and identifying the identified candidate object as the selected asset based at least in part on the color comparison result; and the element of updating the knowledge base comprises adjusting a color parameter associated with the selected asset based on the color value for the identified candidate object.

14. The method claim 11, wherein:

the element of identifying the identified candidate object as the selected asset comprises:

comparing an intensity value in the second dataset for the identified candidate object with an intensity parameter for a plurality of the assets to yield an intensity comparison result, and identifying the identified candidate object as the selected asset based at least in part on the intensity comparison result; and the element of updating the knowledge base comprises instructions to adjust an intensity parameter associated with the selected asset based on the intensity value for the identified candidate object.

15. The method claim 11, wherein the element of outputting an image representing the identified candidate object comprises:
   determining, based on the three-dimensional data for the selected asset, a plurality of views of the identified candidate object; and
   outputting, to one or more of the multiple users, a second image representing the identified candidate object, wherein the first image comprises one of the views and the second image comprises a different one of the views.

16. The method of claim 11, wherein:
   the knowledge base also comprises global positioning system data representing a location of the geographic area; and
   the three-dimensional data comprises light detection and ranging system data including distance information, color information, and intensity information for a plurality of points within the geographic area.

17. The method of claim 1, wherein the element of identifying the identified candidate object as the selected asset comprises:
   identify a group of data points in the second dataset having time stamps that are no more than a first threshold magnitude apart, as well as location values that are no more than a first threshold magnitude apart;
   identify, from within the group, a subset of data points having attributes that match parameters of the selected asset.

18. The method of claim 11, wherein element of outputting the first image representing the identified candidate object comprises:
   determining, a plurality of components within the identified candidate object;
   enhancing a first one of the components to distinguish the first component from a second one of the components; and
   outputting, to one or more of the multiple users, the first image so that the first component is visually distinguished from the second component.

19. A non-transitory computer-readable medium containing programming instructions for causing a processor to:
   access a knowledge base containing a first dataset, the first dataset comprising parameters that are associated with one or more assets;
   access a second dataset, the second dataset comprising three-dimensional data representing a geographic area and one or more candidate objects within the geographic area;
   analyze the three-dimensional data to identify one of the candidate objects as a selected one of the assets by comparing the second dataset with one or more of the parameters in the first dataset;
   output, to multiple users, a first image representing the identified candidate object and a user prompt;
   receive a plurality of user responses from each of the multiple users indicating whether the selected asset matches the identified candidate object; and
   based on receipt of user responses from a threshold number of users that indicate the selected asset matches the identified candidate object and when the identified candidate object has attributes that are at an edge of a parameter range for the selected asset, update the knowledge base by expanding the parameter range associated with the selected asset so that either or both one of an intensity parameter and a color parameter is adjusted.

20. The computer-readable medium of claim 19, wherein:
   the instructions for causing the processor to identify the identified candidate object as the selected asset comprise instructions to:
      comparing a color value in the second dataset for the identified candidate object with a color parameter for a plurality of the assets to yield a color comparison result,
      compare an intensity value in the second dataset for the identified candidate object with an intensity parameter for a plurality of the assets yield an intensity comparison result, and
      identify the identified candidate object as the selected asset based at least in part on the color comparison result and the intensity comparison result; and
   the instructions for causing the processor to update the knowledge base comprise instructions to:
      adjust a color parameter associated with the selected asset based on the color value for the identified candidate object, and
      adjust an intensity parameter associated with the selected asset based on the intensity value for the identified candidate object.

* * * * *